(12) United States Patent
Garcia Arellano et al.

(10) Patent No.: US 12,305,576 B2
(45) Date of Patent: May 20, 2025

(54) RADIATION SHIELD FOR A GASEOUS FUEL CIRCUIT

(71) Applicant: General Electric Company, Schenectady, NY (US)

(72) Inventors: Jose Luis Garcia Arellano, Queretaro (MX); Salvador Zavala Perez, Queretaro (MX); Jesus Barrera Perez, Queretaro (MX)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/147,861

(22) Filed: Dec. 29, 2022

(65) Prior Publication Data

US 2024/0218833 A1 Jul. 4, 2024

(51) Int. Cl.
| | |
|---|---|
| *F02C 7/24* | (2006.01) |
| *F02C 7/22* | (2006.01) |
| *F16L 59/12* | (2006.01) |
| *F16L 59/18* | (2006.01) |
| *F23R 3/60* | (2006.01) |

(52) U.S. Cl.
CPC ............... *F02C 7/24* (2013.01); *F02C 7/222* (2013.01); *F16L 59/12* (2013.01); *F16L 59/184* (2013.01); *F05D 2260/231* (2013.01); *F23R 3/60* (2013.01)

(58) Field of Classification Search
CPC ............................. F02C 7/222; F16L 59/184
See application file for complete search history.

(56) References Cited

U.S. PATENT DOCUMENTS

| | | | | |
|---|---|---|---|---|
| 3,065,768 | A * | 11/1962 | Delsa | F16L 59/12 138/148 |
| RE28,930 | E * | 8/1976 | Johnson | F16L 59/024 138/158 |
| 4,085,580 | A | 4/1978 | Slattery | |
| 5,271,218 | A * | 12/1993 | Taylor | F02C 3/305 60/797 |
| 5,523,581 | A | 6/1996 | Cadwalader | |
| 5,814,825 | A | 9/1998 | Mussman | |
| 9,212,782 | B2 | 12/2015 | Clayton et al. | |
| 10,101,238 | B2 | 10/2018 | Bermudez et al. | |
| 10,184,691 | B2 | 1/2019 | Kuckelkorn | |
| 10,738,931 | B2 * | 8/2020 | Suarez-Valdes Suarez | F16L 59/185 |

(Continued)

FOREIGN PATENT DOCUMENTS

| | | |
|---|---|---|
| CN | 208816906 U | 5/2019 |
| CN | 215891602 U | 2/2022 |
| JP | 20052911354 A | 10/2005 |

OTHER PUBLICATIONS

International Search Report Corresponding to Application No. PCT/US2023/085009 on Apr. 29, 2024.

*Primary Examiner* — Todd E Manahan
*Assistant Examiner* — Alyson Joan Harrington
(74) *Attorney, Agent, or Firm* — Dority & Manning, P.A.

(57) ABSTRACT

A radiation shield assembly for blocking radiation at a gas turbine piping connection joint is provided. The radiation shield assembly includes a radiation shield configured to surround the gas turbine piping connection joint. The radiation shield includes at least two shield portions coupled to one another at a pair of flanged joints. Each shield portion of the at least two shield portions include an inner shell, an outer shell, and insulation disposed between the inner shell and the outer shell.

13 Claims, 7 Drawing Sheets

(56) References Cited

U.S. PATENT DOCUMENTS

| | | | | |
|---|---|---|---|---|
| 11,339,910 | B1* | 5/2022 | Brown | F16L 58/181 |
| 2006/0289471 | A1* | 12/2006 | Sasaki | F16L 53/38 |
| | | | | 219/535 |
| 2010/0300431 | A1* | 12/2010 | Carrascosa Perez | F24S 80/30 |
| | | | | 126/694 |
| 2012/0073299 | A1* | 3/2012 | Bleeker | F16L 59/145 |
| | | | | 60/740 |
| 2015/0052909 | A1* | 2/2015 | Stratton | F23K 5/007 |
| | | | | 60/734 |
| 2015/0068207 | A1 | 3/2015 | Asakura et al. | |
| 2017/0328805 | A1* | 11/2017 | Bermudez | F01D 21/003 |
| 2019/0063328 | A1* | 2/2019 | Keeney | F02C 9/263 |
| 2022/0195929 | A1 | 6/2022 | Aguilar et al. | |

* cited by examiner

RADIATION SHIELD FOR A GASEOUS FUEL CIRCUIT

FIELD

The present disclosure relates generally to radiation shields for a gaseous fuel circuit. Particularly, the present disclosure relates to radiation shields for a gaseous fuel circuit of a gas turbine engine.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The spent combustion gases then exit the gas turbine as exhaust gases via the exhaust section.

A gas turbine fuel system delivers gaseous fuel to the combustion section to be combusted for power generation. The gas fuel systems generally include gas conveying manifolds and piping, gas control valves, gas stop ratio valves, and electrical components housed in a gas fuel module enclosure. As such, the gas fuel module enclosure typically includes a ventilation system to evacuate any gas leaks within the enclosure. Additionally, a separate leak detection system is used to detect any potential fuel leakage from components within the enclosure.

The gaseous fuel is conveyed through gas fuel conveying components within the enclosure, such as piping, manifolds, connection flanges, and/or valves for delivery to the combustion section of the gas turbine engine. The gas fuel conveying components are typically at a very high temperature (due to the high temperature of the gaseous fuel flowing therethrough), which can result in damaging radiative heat transfer between the gas fuel conveying components and the other components within the enclosure (such as the electrical devices, electrical wires, and/or the ventilation system).

Traditional insulation (such as thermal insulative wraps) cannot be used on the gas fuel conveying components due to the risk of explosion. For example, in the event of a gas fuel leak from one or more of the gas fuel conveying components, the gas fuel may become trapped within the insulation, which could cause risk of an explosion. Additionally, trapped gaseous fuel cannot be detected by a gas fuel leak detection system within the enclosure.

As such, an improved system for preventing radiative heat transfer from the gas fuel conveying components within the enclosure is desired. Particularly, an improved system for preventing radiative heat transfer from the gas fuel conveying components without causing a risk of explosion within the enclosure is desired and would be appreciated in the art.

BRIEF DESCRIPTION

Aspects and advantages of the radiation shield assemblies and gaseous fuel supply systems in accordance with the present disclosure will be set forth in part in the following description, or may be obvious from the description, or may be learned through practice of the technology.

In accordance with one embodiment, a radiation shield assembly for blocking radiation at a gas turbine piping connection joint is provided. The radiation shield assembly includes a radiation shield configured to surround the gas turbine piping connection joint. The radiation shield includes at least two shield portions coupled to one another at a pair of flanged joints. Each shield portion of the at least two shield portions includes an inner shell, an outer shell, insulation disposed between the inner shell and the outer shell.

In accordance with another embodiment, a gaseous fuel supply system for a gas turbine engine is provided. The gaseous fuel supply system includes a gaseous fuel supply, an accessory system, and an enclosure. The accessory system is fluidly coupled to a plurality of combustion cans in a combustion section of the gas turbine engine. The gaseous fuel supply system further includes a gas fuel circuit that is disposed at least partially within the enclosure. The gas fuel circuit is fluidly coupled to the gaseous fuel supply and is fluidly coupled to the accessory system. The gas fuel circuit includes a piping connection joint within the enclosure. The gaseous fuel supply system further includes a radiation shield that surrounds the piping connection joint. The radiation shield includes at least two shield portions coupled to one another at a pair of flanged joints. Each shield portion of the at least two shield portions includes an inner shell, an outer shell, and insulation disposed between the inner shell and the outer shell.

These and other features, aspects and advantages of the present radiation shield assemblies and gaseous fuel supply systems will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present radiation shield assemblies and gaseous fuel supply systems, including the best mode of making and using the present systems and methods, directed to one of ordinary skill in the art, is set forth in the specification, which makes reference to the appended figures, in which.

DETAILED DESCRIPTION

Figure 1:
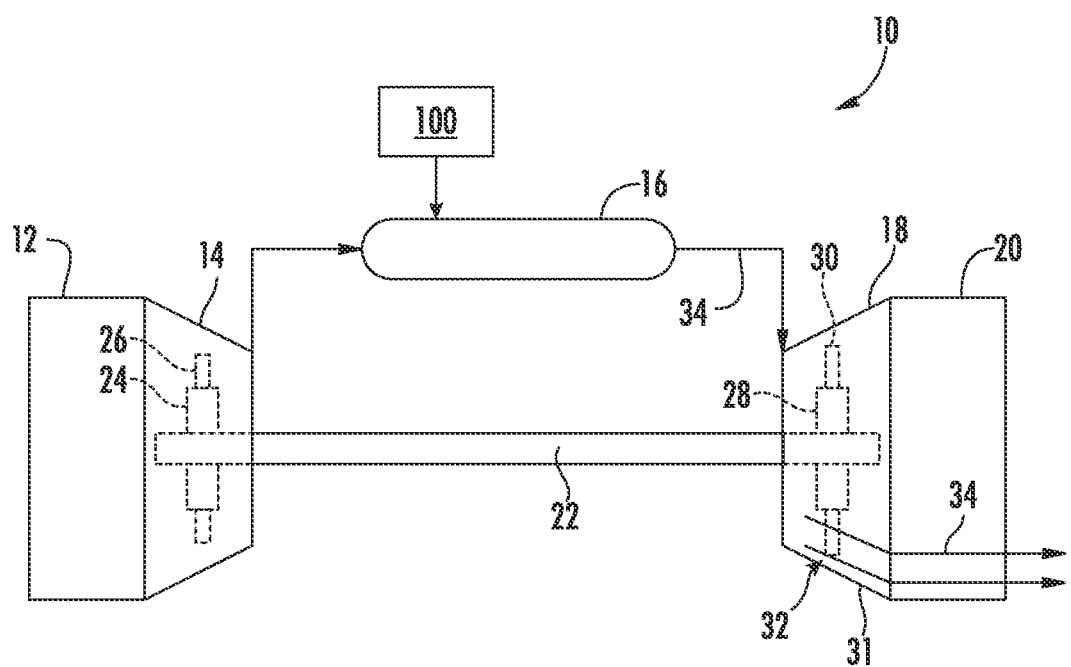
FIG. 1 is a schematic illustration of a turbomachine (e.g., a gas turbine engine), in accordance with embodiments of the present disclosure.

Reference now will be made in detail to embodiments of the present radiation shield assemblies and gaseous fuel supply systems, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component; the term "axially" refers to the relative direction that is substantially parallel and/or coaxially aligned to an axial centerline of a particular component; and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" or "substantially vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. If a component is described as being "directly coupled," "directly fixed," or "directly attached," or the like to another component, no intervening layers or components are present.

As used herein, the terms "comprises," "comprising." "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, the term "line" may refer to a fluid carrying conduit, such as a pipe, manifold, hose, tube, or other suitable fluid carrying conduits.

Here and throughout the specification and claims, in embodiments in which range limitations may be combined and interchanged, such ranges are identified and include all the sub-ranges contained therein unless context or language indicates otherwise. For example, all ranges disclosed herein are inclusive of the endpoints, and the endpoints of overlapping ranges are independently combinable with each other.

Referring now to the drawings, FIG. 1 illustrates a schematic diagram of one embodiment of a turbomachine, which in the illustrated embodiment is a gas turbine engine 10. Although an industrial or land-based gas turbine is shown and described herein, the present disclosure is not limited to an industrial and/or land-based gas turbine unless otherwise specified in the claims. For example, the assemblies and systems as described herein may be used in any type of turbomachine including but not limited to a steam turbine, an aircraft gas turbine, or a marine gas turbine.

As shown, gas turbine engine 10 generally includes an inlet section 12, a compressor section 14 disposed downstream of the inlet section 12, a plurality of combustors (not shown) within a combustion section 16 disposed downstream of the compressor section 14, a turbine section 18 disposed downstream of the combustion section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to a respective rotor disk 24. Each rotor disk 24 in turn may be coupled to or form an upstream portion of the shaft 22 that extends through the compressor section 14.

The turbine section 18 may generally include a plurality of rotor disks 28 (one of which is shown) and a plurality of rotor blades 30 extending radially outwardly from and being interconnected to a respective rotor disk 28. Each rotor disk 28 in turn may be coupled to or form a downstream portion of the shaft 22 that extends through the turbine section 18. The turbine section 18 further includes an outer casing 31 that circumferentially surrounds the downstream portion of the shaft 22 and the rotor blades 30, thereby at least partially defining a hot gas path 32 through the turbine section 18.

In exemplary embodiments, the gas turbine 10 may further include a gaseous fuel supply system 100 fluidly coupled to the combustion section 16. The gaseous fuel supply system 100 may supply gaseous fuel (such as natural gas, hydrogen, or other gaseous fuel) to the combustion section 16.

During operation, a working fluid such as air flows through the inlet section 12 and into the compressor section 14 where the air is progressively compressed, thus providing pressurized air to the combustors of the combustion section 16. The pressurized air is mixed with fuel (e.g., gaseous fuel from the gaseous fuel supply system 100) and burned within each combustor to produce combustion gases 34. The combustion gases 34 flow through the hot gas path 32 from the combustion section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted as an exhaust gas from the gas turbine engine 10 via the exhaust section 20.

Figure 2:
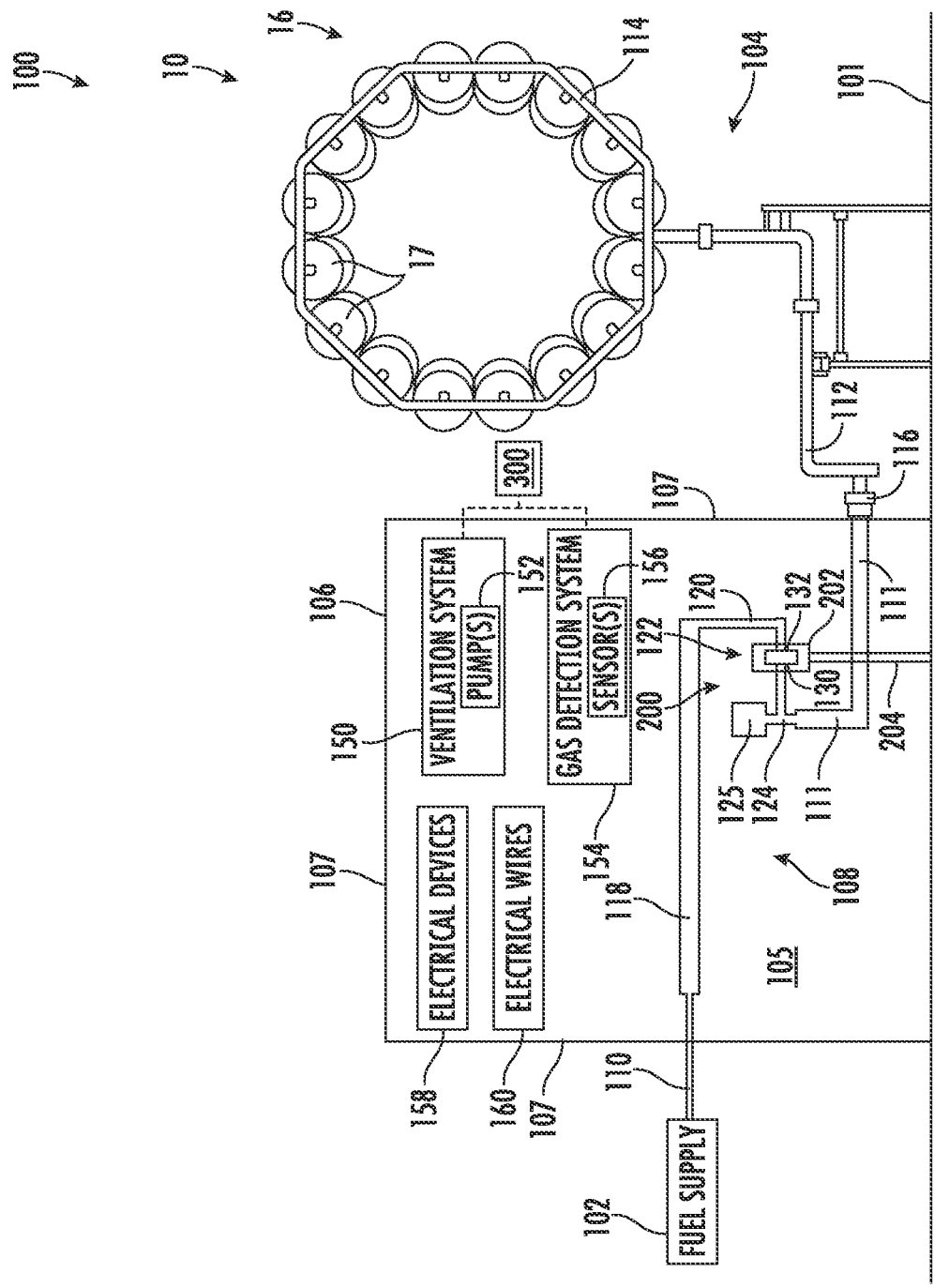
FIG. 2 schematically illustrates a gaseous fuel supply system for a gas turbine engine, in accordance with embodiments of the present disclosure.

Referring now to FIG. 2, a schematic of a gaseous fuel supply system 100 for the gas turbine engine 10 is illustrated, in accordance with embodiments of the present disclosure. As shown, the gaseous fuel supply system 100 may be fluidly coupled to the combustion section 16 of the gas turbine engine 10. For example, the combustion section 16 may include a plurality of combustion cans 17, and the gaseous fuel supply system 100 may be fluidly coupled to each combustion can 17 of the plurality of combustion cans 17, as discussed below.

The gaseous fuel supply system 100 may include a gaseous fuel supply 102, an accessory system 104, an enclosure 106, and a gas fuel circuit 108 disposed at least partially within the enclosure 106. The gaseous fuel supply 102 may be a tank, container, reservoir, pipeline, or other source of gaseous fuel (such as natural gas, hydrogen, or other gaseous fuel). The gaseous fuel supply 102 may fluidly couple to the gas fuel circuit 108 via an inlet line 110, and the gas fuel circuit 108 may fluidly couple to the accessory system 104 via an outlet line 111.

In exemplary embodiments, the gas fuel circuit 108 may include, in a serial flow order, the inlet line 110, a manifold 118, a branch line 120, a pump line 124, and the outlet line 111. The inlet line 110 may extend between, and fluidly couple, the gaseous fuel source 102 and the manifold 118. The manifold 118 may extend between, and fluidly couple, the inlet line 110 and the branch line 120. The branch line 120 may extend between, and fluidly couple, the manifold 118 and the pump line 124. The pump line 124 may be a T-shaped conduit having a first end fluidly coupled to a pump 125, a second end opposite the first end and fluidly coupled to the outlet line 111, and a third end axially offset from the first and second ends and fluidly coupled to the branch line 120.

In many embodiments, a piping connection joint 122 may be disposed between the branch line 120 and the pump line 124. For example, the pump line 124 may include a first flange 130, and the branch line 120 may include a second flange 132, which may couple to one another to form the piping connection joint 122. Particularly, the first flange 130 of the pump line 124 may couple to the second flange 132 of the branch line 120, thereby forming the piping connection joint 122 that fluidly couples the pump line 124 to the branch line 120.

The enclosure 106 may include walls 107 that collectively surround a majority of the gas fuel circuit 108. The enclosure 106 may be disposed on a floor 101 (such as the ground or a concrete pad). In exemplary embodiments, the enclosure 106 may define an interior 105 (e.g., the interior may be defined collectively by the walls 107 and/or the floor 101). The various components of the gas fuel circuit 108 may be disposed within the interior 105 of the enclosure 106.

As shown in FIG. 2, the enclosure 106 may be equipped with a ventilation system 150 and a gas detection system 154 (e.g., a gas leak detection system), each in operable communication with a controller 300. The gas detection system 154 may include one or more sensors 156 configured to measure data indicative a presence of gaseous fuel within the interior 105 of the enclosure 106. For example, the controller 300 may determine, at least partially based on the data indicative of the presence of gaseous fuel within the interior 105, that a fuel leak has occurred in the gas fuel circuit 108 within the enclosure 106. In response, the controller 300 may activate the ventilation system 150. For example, the ventilation system 150 may include one or more pumps 152 fluidly coupled to the interior 105 and fluidly coupled to the atmosphere. As such, activating the pump 152 clears any leaked gaseous fuel from the interior 105 (i.e., evacuates the interior 105).

Additionally, in many embodiments, electrical devices 158 and electrical wires 160 may be disposed within the enclosure 106 (i.e., disposed in the interior 105). The electrical devices 158 may include pumps, valves, sensors, or other electrical devices. The electrical wires 160 (or other electrical couplings) may include power cables, data cables, or other electrical wires 160. The gaseous fuel traveling through the gas fuel circuit 108 within the enclosure may be at a high temperature (such as between about 300° F. and about 600° F., or between about 150° C. and about 315° C.). As such, the electrical devices 158 and the electrical wires 160 (as well as other devices in the enclosure 106) may be susceptible to damage from radiative heat transfer from the various components of the gas fuel circuit 108.

The accessory system 104 is fluidly coupled to each combustion can 17 of the plurality of combustion cans 17. For example, the accessory system 104 may include a connection line 112 and a distribution ring 114. The connection line 112 may extend between a connection flange 116 and the distribution ring 114. The connection line 112 may fluidly couple to the outlet line 111 of the gas fuel circuit 108 outside of the enclosure 106. That is, the outlet line 111 may extend through a wall 107 of the enclosure and fluidly couple to the connection line 112 of the accessory system 104. The distribution ring 114 may extend about an axial centerline of the gas turbine 10 and fluidly couple to each of the combustion cans 17.

In exemplary embodiments, a radiation shield assembly 200 may be disposed within the enclosure 106 (e.g., in the interior 105). The radiation shield assembly 200 may surround the piping connection joint 122 to prevent radiative heat transfer from the piping connection joint 122 from damaging the other components within the enclosure 106 (such as the electrical devices 158, the electrical wires 160, or others). The radiation shield assembly 200 may include a radiation shield 202 and a support assembly 204.

Figure 4:
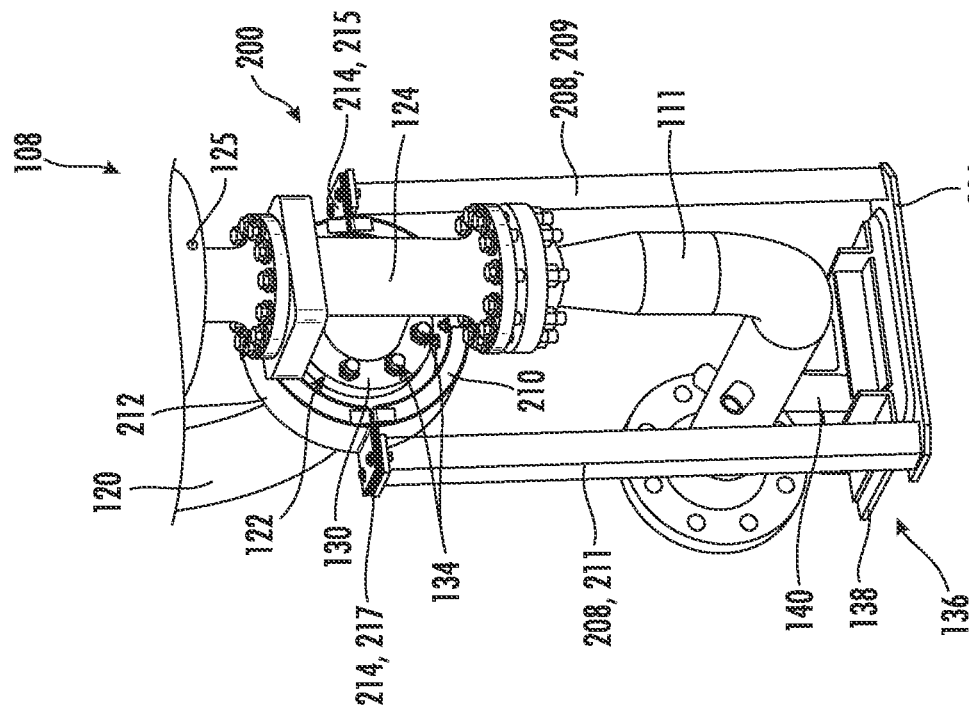
FIG. 4 illustrates a forward-looking-aft perspective view of a portion of the gas fuel circuit shown in FIG. 2 within the enclosure and a radiation shield assembly, in accordance with embodiments of the present disclosure.
Figure 3:
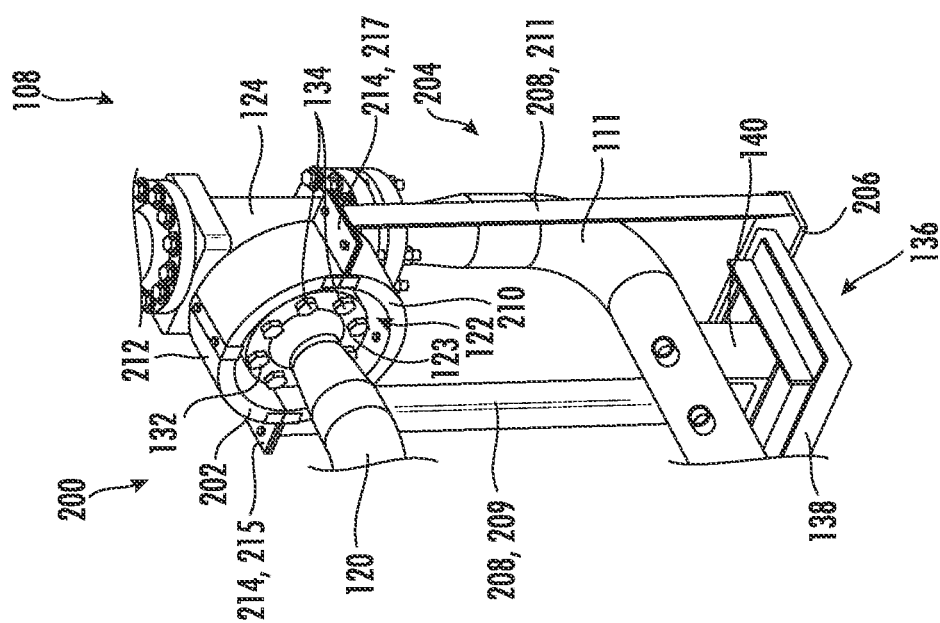
FIG. 3 illustrates an aft-looking-forward perspective view of a portion of the gas fuel circuit shown in FIG. 2 within the enclosure and a radiation shield assembly, in accordance with embodiments of the present disclosure.

Referring now to FIGS. 3 and 4, each figure illustrates a perspective view of a portion of the gas fuel circuit 108 within the enclosure 106 and the radiation shield assembly 200, in accordance with embodiments of the present disclosure. As shown, the radiation shield 202 may surround the piping connection joint 122. The pump line 124 may include a first flange 130, and the branch line 120 may include a second flange 132, which may couple to one another to form the piping connection joint 122. For example, as shown, the first flange 130 and the second flange 132 may be removably couplable via a plurality of fasteners 134, e.g., threaded fasteners (such as threaded nuts and bolts). Alternatively, the first flange 130 and the second flange 132 may be fixedly coupled (via a weld joint or braze joint).

The radiation shield 202 may include at least two shield portions, e.g., a first or inner shield portion 210 and a second or outer shield portion 212, coupled to one another at a pair of flanged joints 214. In exemplary embodiments, as shown, the radiation shield 202 may include a first flanged end 215 and a second flanged end 217. In such embodiments, the first shield portion 210 and the second shield portion 212 may be removably couplable to one another at the first flanged end 215 and the second flanged end 217 via one or more fasteners 220 (such as threaded fasteners or others). This advantageously allows the radiation shield 202 to be quickly disassembled for repair and/or inspection of the piping connection joint 122.

The support assembly 204 may couple to the floor 101 (or to one of the walls 107 of the enclosure 106) to keep the radiation shield 202 supported around the piping connection joint 122. Particularly, the support assembly 204 may include a support plate 206 (which may be positioned on the floor 101, another surface, or another component) and at least one support member 208 that extends (generally perpendicularly) from the support plate 206. For example, the support member 208 may extend between the support plate 206 and one of the flanged joints 214. Particularly, the support assembly 204 may include a first support member 209 and a second support member 211. The first support member 209 may extend from a first end 222 of the support plate 206 to the first flanged end 215, and the second support member 211 may extend from a second end 224 of the support plate 206 to the second flanged end 217.

In many embodiments, the outlet line 111 may include a piping support bracket 136 that contacts the outlet line 111 to provide structural support. The piping support bracket 136 may include a base plate 138 and one or more walls 140 extending from the base plate 138 to the outlet line 111. In various embodiments, the base plate 138 may be positioned on the support plate 206 of the support assembly 204. For example, the base plate 138 may be disposed on a top surface of the support plate 206 between the first support member 209 and the second support member 211.

Figure 5:
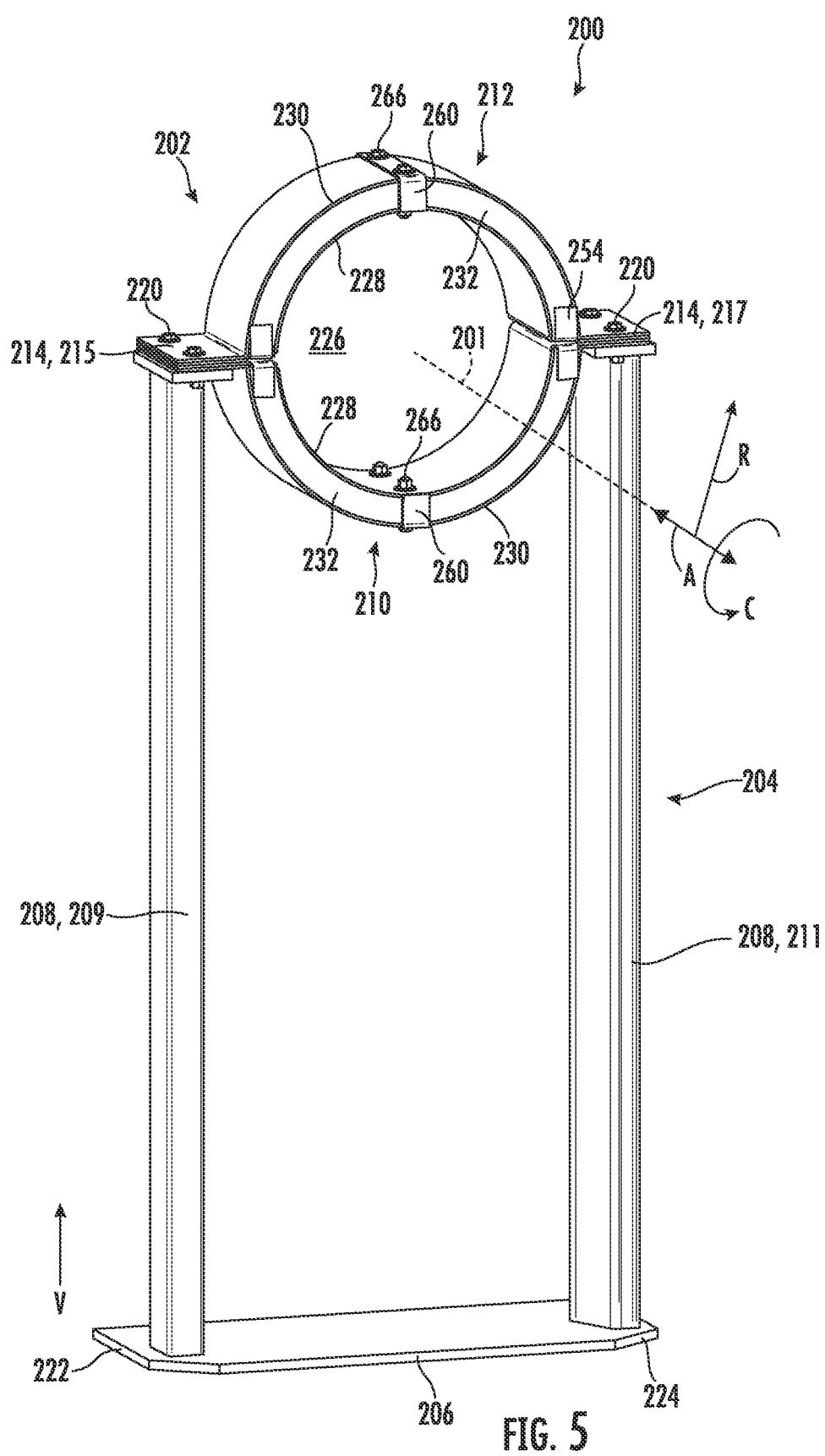
FIG. 5 illustrates a perspective view of the radiation shield assembly of FIGS. 2 through 4, in accordance with embodiments of the present disclosure.
Figure 6:
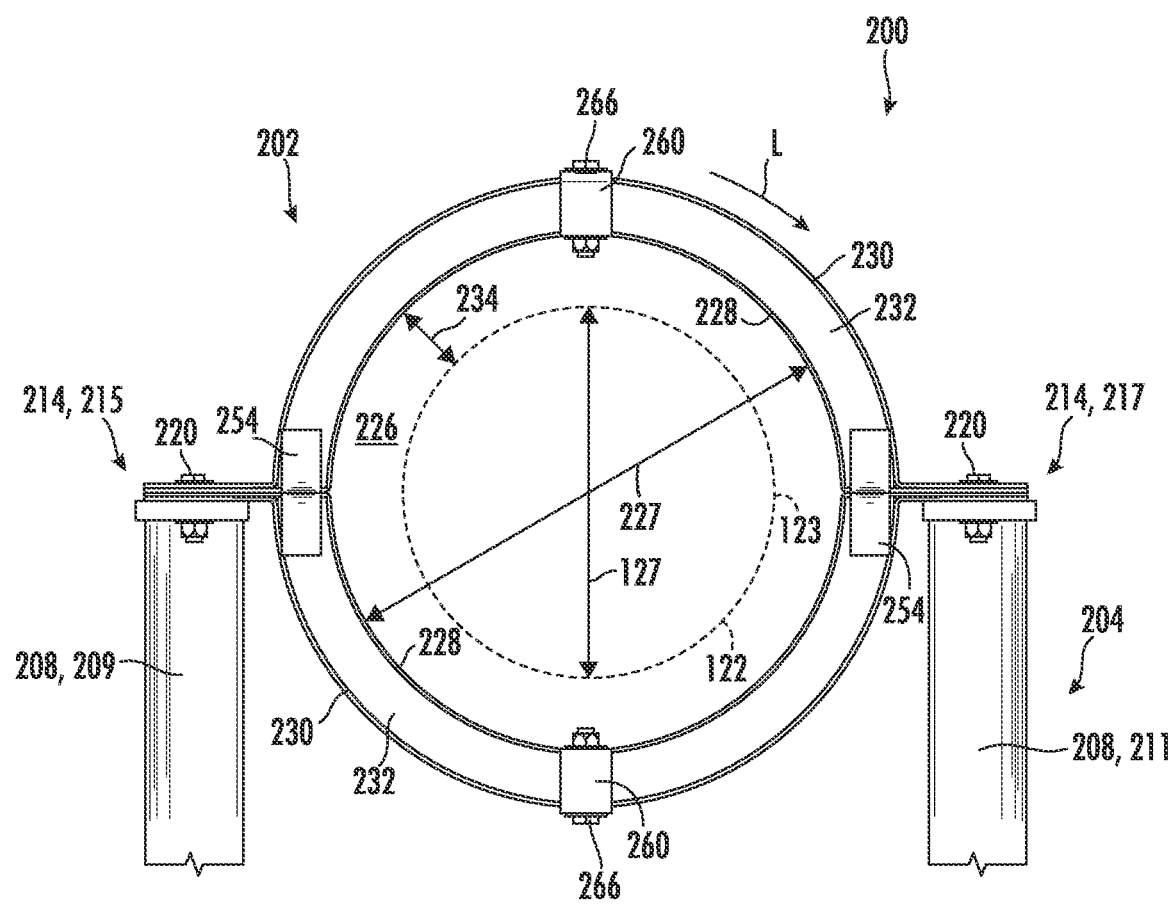
FIG. 6 illustrates an enlarged side view of the radiation shield assembly of FIGS. 2 through 5, in accordance with embodiments of the present disclosure.
Figure 7:
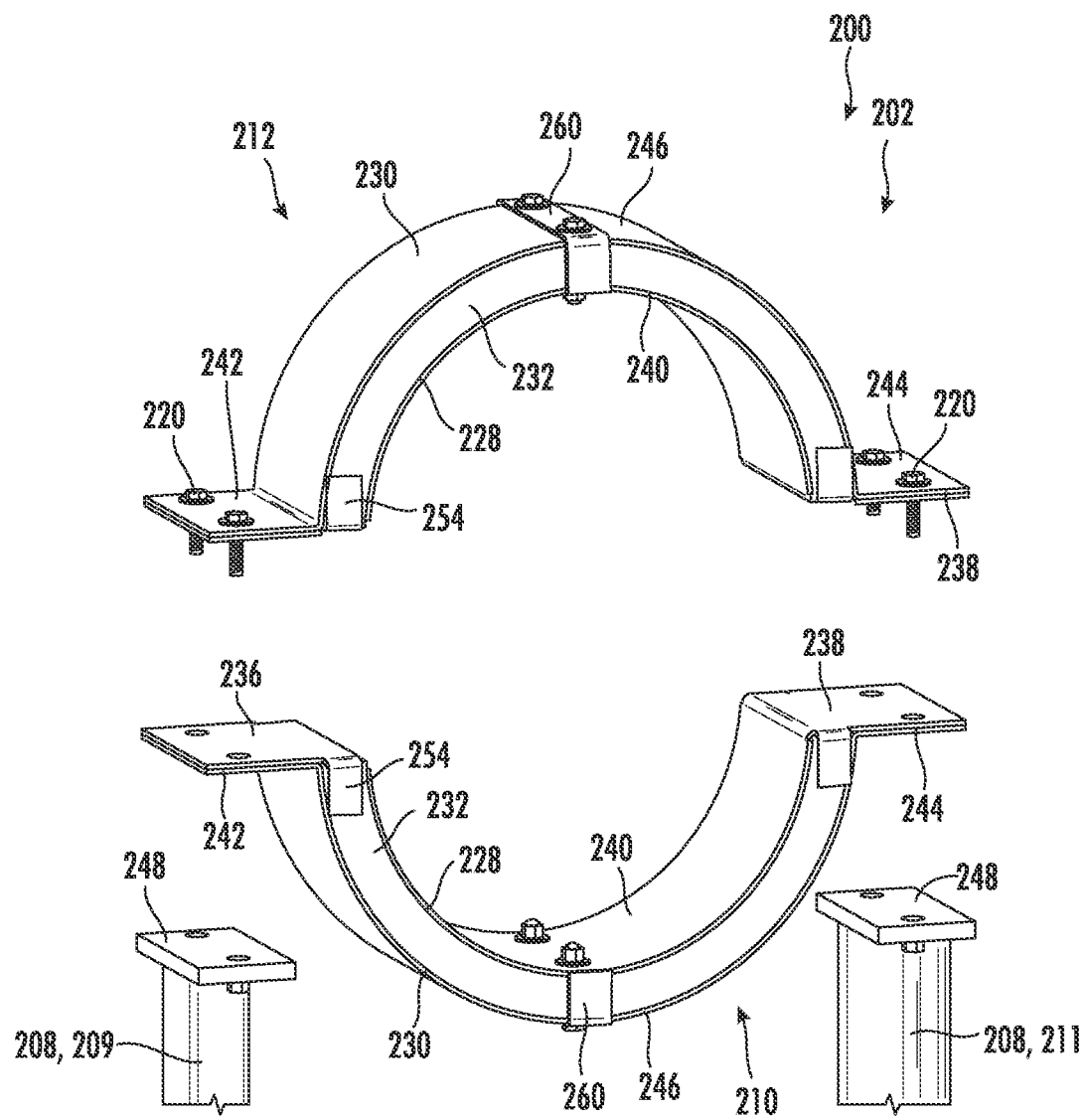
FIG. 7 illustrates an enlarged perspective view of a radiation shield assembly, in which the radiation shield assembly of FIGS. 2 through 6 is partially exploded, in accordance with embodiments of the present disclosure.
Figure 8:
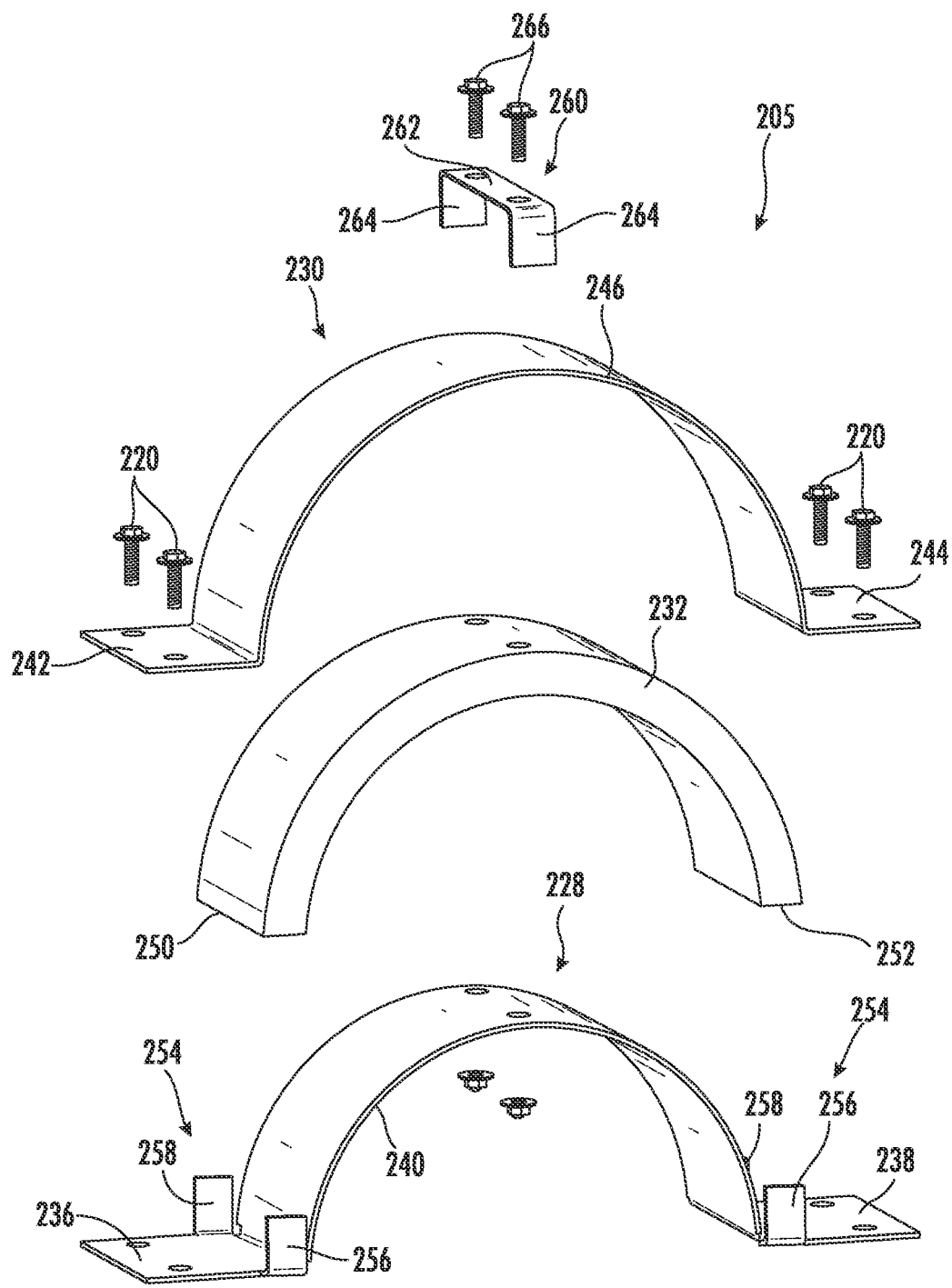
FIG. 8 illustrates an exploded view of a shield portion of a radiation shield of the radiation shield assembly of FIGS. 2 through 7, in accordance with embodiments of the present disclosure.

Referring now to FIGS. 5 through 8, various views of a radiation shield assembly 200 are illustrated in accordance with embodiments of the present disclosure. Particularly, FIG. 5 illustrates a perspective view of the radiation shield assembly 200. FIG. 6 illustrates an enlarged side view of the radiation shield assembly 200. FIG. 7 illustrates an enlarged perspective view of the radiation shield assembly 200, in which the radiation shield 202 is partially exploded. FIG. 8 illustrates an exploded view of a shield portion 205 (such as the inner shield portion 210 or the outer shield portion 212) of the radiation shield 202 of the radiation shield assembly 200, in accordance with embodiments of the present disclosure.

As shown in FIG. 5, the radiation shield assembly 200 may define a vertical direction V, which may be oriented opposite the direction of gravity. The support plate 206 may be generally flat or planar, which advantageously allows for the radiation shield assembly 200 to sit or be mounted securely on the floor. That is, the planar support plate 206 allows for equal distribution of the weight of the radiation shield 202. In exemplary embodiments, the first support member 209 may extend from the first end 222 of the support plate 206 to the first flanged end 215, and the second support member 211 may extend from the second end 224 of the support plate 206 to the second flanged end 217.

The radiation shield 202 may define a circular opening 226 and an axial centerline 201. For example, the first shield portion 210 and the second shield portion 212 may collectively define the circular opening 226. In operation, the piping connection joint 122 may be disposed within the circular opening 226 (as shown in FIGS. 3 and 4). The axial centerline 201 may extend through a center point of the circular opening 226. The radiation shield 202 may define a cylindrical coordinate system having an axial direction A that extends along the axial centerline 201, a radial direction R that is orthogonal (or perpendicular) to the axial centerline 201, and a circumferential direction C extending around the axial centerline 201.

As will be described below in more detail, the inner shield portion 210 and the outer shield portion 212 may each include an inner shell 228, an outer shell 230 (at least partially radially spaced apart from the inner shell 228), and insulation 232 disposed between the inner shell 228 and the outer shell 230. The inner shell 228 of the inner shield portion 210 and the inner shell 228 of the outer shield portion 212 may collectively define the circular opening 226. As shown in FIG. 6 (e.g., by the phantom line representing the outermost surface 123 of the piping connection joint 122), the outermost diameter 127 of the piping connection joint 122 may be smaller than the innermost diameter 227 of the radiation shield 202 (which is defined collectively by the inner shell 228 of the inner and outer shield portions 210, 212).

Stated otherwise, the innermost diameter 227 may be between about 10% and about 50% larger than the outermost diameter 127 of the piping connection joint 122, or such as between about 20% and about 40%, or such as between about 25% and about 35%. Furthermore, a clearance 234 may be defined between the inner shell 228 and the outermost surface 123 of the piping connection joint 122. The clearance 234 may be between about 0.25 inches and about 3 inches (i.e., between about 0.6 cm and about 7.6 cm), or such as between about 0.5 inches and about 2 inches (i.e., between about 1.3 cm and about 5.1 cm), or such as between about 0.75 inches and about 1.5 inches (i.e., between about 1.9 cm and about 3.8 cm), or such as about 1 inch (i.e., about 2.54 cm). The clearance 234 may advantageously provide for ventilation (e.g., airflow) between the piping connection joint 122 and the radiation shield 202. As such, in the event of a gas fuel leak from the piping connection joint 122, there may be sufficient airflow for the fuel to vent or clear the piping connection joint 122 (e.g., via the ventilation system 150) without causing risk of an explosion within the enclosure 106.

As shown in FIG. 7, the first shield portion 210 and the second shield portion 212 may be removably couplable to one another (and to the support assembly 204) at the first flanged end 215 and the second flanged end 217 via one or more fasteners 220 (such as threaded fasteners or others). This advantageously allows the radiation shield 202 to be quickly disassembled for repair and/or inspection of the piping connection joint 122.

The support assembly 204 may further include a connection plate 248 fixedly coupled to each support member 209, 211. For example, the connection plate 248 may be welded to a terminal end of each respective support member 209 opposite the support plate 206. The connection plate 248 may be generally parallel to the flanged ends 215 and 217, such that the connection plate 248 may make flush contact (i.e., continuous contact) with the flanged ends 215 and 217 and be coupled thereto with the fasteners 220.

In exemplary embodiments, the inner shell 228 of the first shield portion 210 and the second shield portion 212 may include a first inner connection flange 236 at the first flanged end 215, a second inner connection flange 238 at the second flanged end 217, and an inner arcuate portion 240 extending between the first inner connection flange 236 and the second inner connection flange 238. Similarly, the outer shell 230 of the first shield portion 210 and the second shield portion 212 may include a first outer connection flange 242 at the first flanged end 215, a second outer connection flange 244 at the second flanged end 217, and an outer arcuate portion 246 extending between the first outer connection flange 242 and the second outer connection flange 244.

The first inner and outer connection flanges 236, 242 of the first shield portion 210 and the second shield portion 212 may stack together to collectively form the first flanged end 215 of the radiation shield 202 (as shown in FIG. 6). For example, the first inner and outer connection flanges 236, 242 of the first shield portion 210 and the second shield portion 212 may each be shaped as flat (or planar) plates that are generally parallel to one another, such that the first inner and outer connection flanges 236, 242 may stack together and be in flush contact with each other. Particularly, the first outer connection flange 242 of the first shield portion 210, the first inner connection flange 236 of the first shield portion 210, the first inner connection flange 236 of the second shield portion 212, and the first outer connection flange 242 of the second shield portion 212 may stack together to collectively form the first flanged end 215 (or referred to as the first stacked flanged end).

Likewise, the second inner and outer connection flanges 238, 244 of the first shield portion 210 and the second shield portion 212 may stack together to collectively form the second flanged end 217 of the radiation shield 202. For example, the second inner and outer connection flanges 238, 244 of the first shield portion 210 and the second shield portion 212 may each be shaped as flat (or planar) plates that are generally parallel to one another, such that the second inner and outer connection flanges 238, 244 may stack together and be in flush contact with each other. Particularly, the second outer connection flange 244 of the first shield portion 210, the second inner connection flange 238 of the first shield portion 210, the second inner connection flange 238 of the second shield portion 212, and the second outer connection flange 244 of the second shield portion 212 may stack together to collectively form the second flanged end 217 (or referred to as the second stacked flanged end).

Each of the fasteners 220 may extend through one of the flanged ends 215, 217 and through a connection plate 248 to couple the radiation shield 202 to the support assembly. Particularly, each fastener 220 at the first flanged end 215 may extend through the first outer connection flange 242 of the second shield portion 212, the first inner connection flange 236 of the second shield portion 212, the first inner connection flange 236 of the first shield portion 210, the first outer connection flange 242 of the first shield portion 210, and the connection plate 248 to couple the first flanged end 215 to the support assembly 204. Similarly, each fastener 220 at the second flanged end 217 may extend through the second outer connection flange 244 of the second shield portion 212, the second inner connection flange 238 of the second shield portion 212, the second inner connection flange 238 of the first shield portion 210, the second outer connection flange 242 of the first shield portion 210, and the connection plate 248 to couple the second flanged end 217 to the support assembly 204.

As shown in FIG. 8, which illustrates an exploded view of a shield portion 205 (such as the first shield portion 210 and/or the second shield portion 212), the insulation 232 may have a semi-circular cross-sectional shape and may extend between a first terminal end 250 and a second terminal end 252. Stated otherwise, the insulation 232 may be shaped as a hollow half-cylinder and may be disposed between (e.g., radially between) the inner arcuate portion 240 and the outer arcuate portion 246. The inner arcuate portion 240 and the outer arcuate portion 246 may have a semi-circular cross-sectional shape.

In exemplary embodiments, the first inner connection flange 236 and the second inner connection flange 238 extend radially outwardly across the insulation 232. That is, the first inner connection flange 236 may extend radially outwardly from the inner arcuate portion 240 and across the first terminal end 250 of the insulation 232. Similarly, the second inner connection flange 238 may extend radially outwardly from the inner arcuate portion 240 and across the second terminal end 252 of the insulation 232. This may advantageously keep the insulation 232 positioned between the inner arcuate portion 240 and the outer arcuate portion 246.

In many embodiments, as shown, the first inner connection flange 236 and the second inner connection flange 238 may each include a pair of tabs 254 disposed on opposite sides of the insulation 232 and in contact with the insulation 232. For example, a first pair of tabs 254 may extend generally perpendicularly from the first inner connection flange 236, and a second pair of tabs 254 may extend generally perpendicularly from the second inner connection flange 238. Each pair of tabs 254 may include a first tab 256 and a second tab 258 spaced apart (e.g., axially spaced apart) from the first tab 256. The first tab 256 and the second tab 258 may be generally parallel to one another and disposed on opposite sides of the insulation 232.

In various embodiments, the shield portion 205 of the radiation shield 202 may include one or more brackets 260 coupled to the outer arcuate portion 246 and the inner arcuate portion 240. The bracket 260 may include an axial portion 262 and radial portions 264. The axial portion 262 may extend along the outer arcuate portion 246, and the radial portions 264 may extend generally radially from the axial portion 262 on opposite sides of the insulation 232. The bracket 260 may be coupled to the shield portion 205 via fasteners 266 (e.g., threaded fasteners, such as nuts and bolts). For example, the fasteners 266 may extend through the axial portion 262 of the bracket 260, the outer arcuate portion 246, the insulation 232, and the inner arcuate portion 240. The bracket 260 may be disposed equidistantly between the first flanged end 215 and the second flanged end 217.

That is, the brackets may be disposed 90 degrees from the first flanged end 215 and/or the second flanged end 217 with respect to the axial centerline 201. This positioning advantageously provides increased structural integrity to the radiation shield 202 and prevents the insulation 232 from shifting or falling out from between the inner shell 228 and the outer shell 230.

In various embodiments, the insulation 232 may be a wool-type pipe insulation. Particularly, the insulation 232, may be a mandrel-wound, mineral wool pipe insulation with a thermosetting resin binder, which may advantageously insulate in environments of up to about 1200° F. (about 650° C.). Alternatively, or additionally, the insulation 232 may be glass fiber type insulation. In such embodiments, the insulation may include type "E" glass fibers needled together into a mat form.

The radiation shield assembly 200 disclosed herein advantageously prevents or blocks thermal radiation from the piping connection joint 122 from damaging other components within the enclosure 106. Particularly, the radiation shield assembly 200 advantageously prevents thermal damage to the electrical components within the enclosure 106 while providing adequate clearance between the radiation shield 202 and the piping connection joint 122 for proper ventilation, thereby mitigating the risk of trapped fuel gas between the piping connection joint 122 and the radiation shield 202.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A radiation shield assembly for blocking radiation at a gas turbine piping connection joint, the radiation shield assembly comprising: a radiation shield configured to surround the gas turbine piping connection joint, the radiation shield comprising at least two shield portions coupled to one another at a pair of flanged joints, wherein each shield portion of the at least two shield portions comprises: an inner shell; an outer shell; and insulation disposed between the inner shell and the outer shell.

The radiation shield assembly as in one or more of these clauses, wherein the insulation is disposed wholly within the radiation shield between the inner shell and the outer shell; and wherein the radiation shield is sized to provide a clearance between the respective inner shells of the at least two shield portions and the gas turbine piping connection joint.

The radiation shield assembly as in one or more of these clauses, further comprising a support assembly including a support plate and at least one support member coupled to the radiation shield; wherein the at least one support member extends between the support plate and one of the pair of flanged joints of the radiation shield.

The radiation shield assembly as in one or more of these clauses, wherein the pair of flanged joints comprises a first flanged end and a second flanged end; and wherein the second flanged end is opposite the first flanged end.

The radiation shield assembly as in one or more of these clauses, wherein the inner shell further comprises a first inner connection flange at the first flanged end, a second inner connection flange at the second flanged end, and an inner arcuate portion extending between the first inner connection flange and the second inner connection flange.

The radiation shield assembly as in one or more of these clauses, wherein the first inner connection flange and the second inner connection flange extend radially outwardly across the insulation.

The radiation shield assembly as in one or more of these clauses, wherein the first inner connection flange and the second inner connection flange each comprise a pair of tabs disposed on opposite sides of the insulation and in contact with the insulation.

The radiation shield assembly as in one or more of these clauses, wherein the outer shell further comprises a first outer connection flange at the first flanged end, a second outer connection flange at the second flanged end, and an outer arcuate portion extending between the first outer connection flange and the second outer connection flange.

The radiation shield assembly as in one or more of these clauses, wherein the first outer connection flange is coupled to the first inner connection flange, and wherein the second outer connection flange is coupled to the second inner connection flange.

The radiation shield assembly as in one or more of these clauses, wherein the radiation shield includes one or more support brackets coupled to the outer arcuate portion and the inner arcuate portion.

A gaseous fuel supply system for a gas turbine engine, the gaseous fuel supply system comprising: a gaseous fuel supply; an accessory system fluidly coupled to a plurality of combustion cans in a combustion section of the gas turbine engine; an enclosure; a gas fuel circuit disposed at least partially within the enclosure, the gas fuel circuit fluidly coupled to the gaseous fuel supply and fluidly coupled to the accessory system, wherein the gas fuel circuit includes a piping connection joint within the enclosure; and a radiation shield surrounding the piping connection joint, the radiation shield comprising at least two shield portions coupled to one another at a pair of flanged joints, wherein each shield portion of the at least two shield portions comprises: an inner shell; an outer shell; and insulation disposed between the inner shell and the outer shell.

The gaseous fuel supply system as in one or more of these clauses, wherein the gas fuel circuit further comprises a manifold, a branch line extending from the manifold to the piping connection joint, a pump line extending from the piping connection joint, and an outlet line extending from the pump line to the accessory system.

The gaseous fuel supply system as in one or more of these clauses, wherein electrical devices, electrical wires, a ventilation system, and a gas detection system are disposed within the enclosure.

The gaseous fuel supply system as in one or more of these clauses, wherein the insulation is disposed wholly within the radiation shield between the inner shell and the outer shell; and wherein the radiation shield is sized to provide a clearance between the respective inner shells of the at least two shield portions and the gas turbine piping connection joint.

The gaseous fuel supply system as in one or more of these clauses, further comprising a support assembly including a support plate and at least one support member coupled to the radiation shield; and wherein the at least one support member extends between the support plate and one of the pair of flanged joints of the radiation shield.

The gaseous fuel supply system as in one or more of these clauses, wherein the pair of flanged joints comprises a first flanged end and a second flanged end; and wherein the second flanged end is opposite the first flanged end.

The gaseous fuel supply system as in one or more of these clauses, wherein the inner shell further comprises a first inner connection flange at the first flanged end, a second inner connection flange at the second flanged end, and an inner arcuate portion extending between the first inner connection flange and the second inner connection flange.

The gaseous fuel supply system as in one or more of these clauses, wherein the first inner connection flange and the second inner connection flange extend radially outwardly across the insulation.

The gaseous fuel supply system as in one or more of these clauses, wherein the first inner connection flange and the second inner connection flange each comprise a pair of tabs disposed on opposite sides of the insulation and in contact with the insulation.

The gaseous fuel supply system as in one or more of these clauses, wherein the outer shell further comprises a first outer connection flange at the first flanged end, a second outer connection flange at the second flanged end, and an outer arcuate portion extending between the first outer connection flange and the second outer connection flange.

What is claimed is:

1. A radiation shield assembly for blocking radiation at a gas turbine piping connection joint, the radiation shield assembly comprising:
   a radiation shield configured to surround the gas turbine piping connection joint, the radiation shield comprising at least two shield portions coupled to one another at a first flanged end and a second flanged end opposite the first flanged end, wherein each shield portion of the at least two shield portions comprises:
      an inner shell comprising an inner arcuate portion extending between the first flanged end and the second flanged end, a first inner connection flange extending radially outward from the inner arcuate portion at the first flanged end, and a second inner connection flange extending radially outward from the inner arcuate portion at the second flanged end;
      an outer shell including an outer arcuate portion, a first outer connection flange extending radially outwardly from the outer arcuate portion at the first flanged end, and a second outer connection flange extending radially outwardly from the outer arcuate portion at the second flanged end; and
      insulation disposed between the inner shell and the outer shell, the insulation extending between a first terminal end adjacent the first flanged end and a second terminal end adjacent the second flanged end, wherein the first inner connection flange extends radially outward across the first terminal end and further extends radially outward of the outer arcuate portion parallel to the first outer connection flange such that the first inner connection flange and the first outer connection flange stack together in flush contact, and wherein the second inner connection flange extends radially outward across the second terminal end and further extends radially outward of the outer arcuate portion parallel to the second outer connection flange such that the second inner connection flange and the second outer connection flange stack together in flush contact.

2. The radiation shield assembly as in claim 1, wherein the insulation is disposed wholly within the radiation shield between the inner shell and the outer shell; and wherein the radiation shield is sized to provide a clearance between the respective inner shells of the at least two shield portions and the gas turbine piping connection joint.

3. The radiation shield assembly as in claim 1, further comprising a support assembly including a support plate and at least one support member coupled to the radiation shield; wherein the at least one support member extends between the support plate and one of the first flanged end and the second flanged end of the radiation shield.

4. The radiation shield assembly as in claim 1, wherein the first inner connection flange and the second inner connection flange each comprise a pair of tabs disposed on opposite sides of the insulation and in contact with the insulation.

5. The radiation shield assembly as in claim 1, wherein the outer arcuate portion extends between the first outer connection flange and the second outer connection flange.

6. The radiation shield assembly as in claim 5, wherein the first outer connection flange is mechanically coupled to the first inner connection flange, and wherein the second outer connection flange is mechanically coupled to the second inner connection flange.

7. The radiation shield assembly as in claim 5, wherein the radiation shield includes one or more support brackets coupled to the outer arcuate portion.

8. A gaseous fuel supply system for a gas turbine engine, the gaseous fuel supply system comprising:
   a gaseous fuel supply;
   an accessory system fluidly coupled to a plurality of combustion cans in a combustion section of the gas turbine engine;
   an enclosure;
   a gas fuel circuit disposed at least partially within the enclosure, the gas fuel circuit fluidly coupled to the gaseous fuel supply and fluidly coupled to the accessory system, wherein the gas fuel circuit includes a piping connection joint within the enclosure; and
   a radiation shield surrounding the piping connection joint, the radiation shield comprising at least two shield portions coupled to one another at a first flanged end and a second flanged end opposite the first flanged end, wherein each shield portion of the at least two shield portions comprises:
      an inner shell comprising an inner arcuate portion extending between the first flanged end and the second flanged end, a first inner connection flange extending radially outward from the inner arcuate portion at the first flanged end, and a second inner connection flange extending radially outward from the inner arcuate portion at the second flanged end;
      an outer shell including an outer arcuate portion, a first outer connection flange extending radially outwardly from the outer arcuate portion at the first flanged end, and a second outer connection flange extending radially outwardly from the outer arcuate portion at the second flanged end; and
      insulation disposed between the inner shell and the outer shell, the insulation extending between a first terminal end adjacent the first flanged end and a second terminal end adjacent the second flanged end, wherein the first inner connection flange extends radially outward across the first terminal end and further extends radially outward of the outer arcuate portion parallel to the first outer connection flange such that the first inner connection flange and the first outer connection flange stack together in flush contact, and wherein the second inner connection flange extends radially outward across the second terminal end and further extends radially outward of the outer arcuate portion parallel to the second outer connection flange such that the second inner connection flange and the second outer connection flange stack together in flush contact.

9. The gaseous fuel supply system as in claim 8, wherein the gas fuel circuit further comprises a manifold, a branch line extending from the manifold to the piping connection joint, a pump line extending from the piping connection joint, and an outlet line extending from the pump line to the accessory system.

10. The gaseous fuel supply system as in claim 8, wherein electrical devices, electrical wires, a ventilation system, and a gas detection system are disposed within the enclosure.

11. The gaseous fuel supply system as in claim 8, wherein the insulation is disposed wholly within the radiation shield between the inner shell and the outer shell; and wherein the radiation shield is sized to provide a clearance between the respective inner shells of the at least two shield portions and the piping connection joint.

12. The gaseous fuel supply system as in claim 8, further comprising a support assembly including a support plate and at least one support member coupled to the radiation shield; and wherein the at least one support member extends between the support plate and one of the first flanged end and the second flanged end of the radiation shield.

13. The gaseous fuel supply system as in claim 8, wherein the first inner connection flange and the second inner connection flange each comprise a pair of tabs disposed on opposite sides of the insulation and in contact with the insulation.

* * * * *